US007035308B1

(12) United States Patent
McNeil et al.

(10) Patent No.: US 7,035,308 B1
(45) Date of Patent: Apr. 25, 2006

(54) METHOD AND SYSTEM FOR COUNTERING LASER TECHNOLOGY

(75) Inventors: Scott Earl McNeil, Ashburn, VA (US); Martin Joseph Fritts, Davidsonville, MD (US); Roy Reed Heddleston, Woodbridge, VA (US); Martin B. Mark, Silver Spring, MD (US)

(73) Assignee: Science Applications International Corporation, San Diego, CA (US)

( * ) Notice: Subject to any disclaimer, the term of this patent is extended or adjusted under 35 U.S.C. 154(b) by 309 days.

(21) Appl. No.: 10/411,274

(22) Filed: Apr. 11, 2003

Related U.S. Application Data

(60) Provisional application No. 60/421,574, filed on Oct. 28, 2002.

(51) Int. Cl.
*H01S 3/00* (2006.01)
*H01Q 17/00* (2006.01)
*B32B 15/02* (2006.01)
*B32B 17/02* (2006.01)
*B32B 19/00* (2006.01)

(52) U.S. Cl. .............................. 372/109; 342/1; 342/2; 342/3; 342/4; 428/403; 428/404; 428/405; 428/406; 428/407; 428/919

(58) Field of Classification Search ................ 372/109; 342/1–4; 428/403–407, 919
See application file for complete search history.

(56) References Cited

U.S. PATENT DOCUMENTS

| 4,137,361 | A | * | 1/1979 | Deffeyes et al. ............ 428/328 |
|---|---|---|---|---|
| 5,196,396 | A | | 3/1993 | Lieber ........................... 505/1 |
| 5,252,835 | A | | 10/1993 | Lieber et al. ............ 250/492.1 |
| 5,262,357 | A | | 11/1993 | Alivisatos et al. .......... 437/233 |
| 5,505,928 | A | * | 4/1996 | Alivisatos et al. .......... 423/299 |
| 5,786,785 | A | * | 7/1998 | Gindrup et al. ................ 342/1 |
| 5,840,435 | A | | 11/1998 | Lieber et al. ................ 428/698 |
| 5,897,945 | A | | 4/1999 | Lieber et al. ................ 428/323 |
| 5,990,479 | A | | 11/1999 | Weiss et al. ................ 250/307 |
| 5,997,832 | A | | 12/1999 | Lieber et al. ................ 423/249 |
| 6,036,774 | A | | 3/2000 | Lieber et al. ................ 117/105 |
| 6,159,742 | A | | 12/2000 | Lieber et al. ................ 436/164 |
| 6,190,634 | B1 | | 2/2001 | Lieber et al. ................ 423/439 |
| 6,306,736 | B1 | | 10/2001 | Alivisatos et al. .......... 438/497 |
| 6,863,942 | B1 | * | 3/2005 | Ren et al. ................... 428/36.9 |
| 2003/0185741 | A1 | * | 10/2003 | Matyjaszewski ........ 423/445 R |
| 2004/0146560 | A1 | * | 7/2004 | Whiteford et al. .......... 424/484 |
| 2004/0180203 | A1 | * | 9/2004 | Yadav et al. ................ 428/402 |
| 2005/0064731 | A1 | * | 3/2005 | Park et al. ................... 438/800 |

OTHER PUBLICATIONS

Tang, Z., et al., "Spontaneous Organization of Single CdTe Nanoparticles into Luminescent Nanowires," Science, vol. 297, pp. 237-240, Jul. 12, 2002.*

(Continued)

*Primary Examiner*—Don Wong
*Assistant Examiner*—Leith Al-Nazer
(74) *Attorney, Agent, or Firm*—Kilpatrick Stockton LLP

(57) ABSTRACT

Described herein is a method and system for providing a countermeasure against laser detection systems using nano-component material that is tailored to cloak or obscure a target from detection by transmitted laser radiation. The nanodot material absorbs and/or down-converts the transmitted laser radiation. Similarly, described herein is a method and system for providing a countermeasure against laser systems intended to blind a target through the use of a specifically engineered nanocomponent material for absorbing and/or down-converting the radiation from the laser system.

17 Claims, 5 Drawing Sheets

OTHER PUBLICATIONS

Figure 1B:
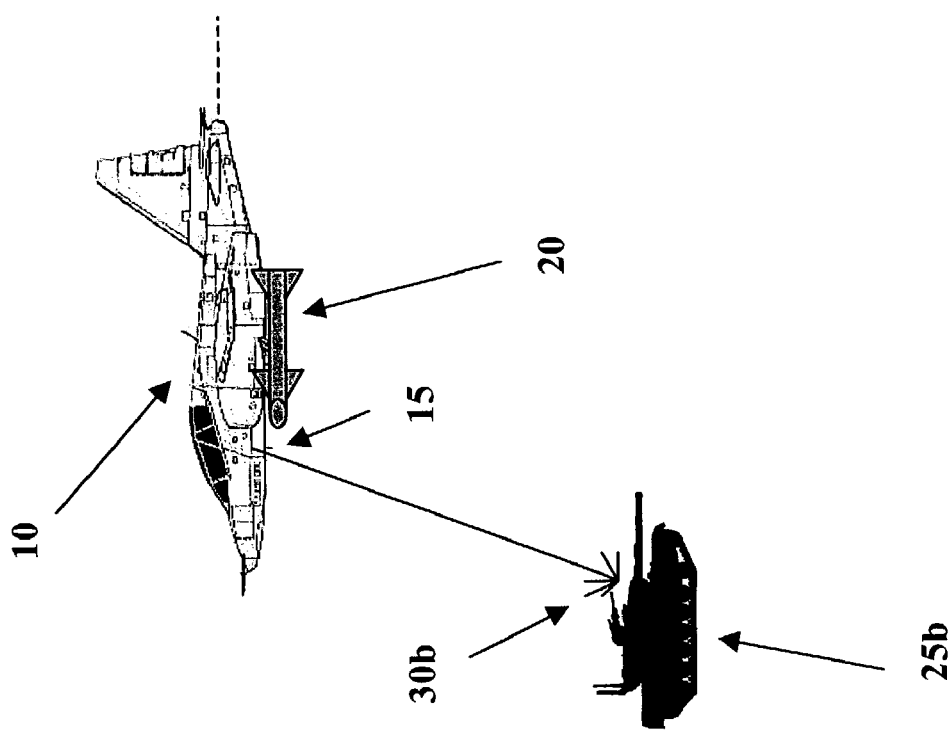
Figure 1A:
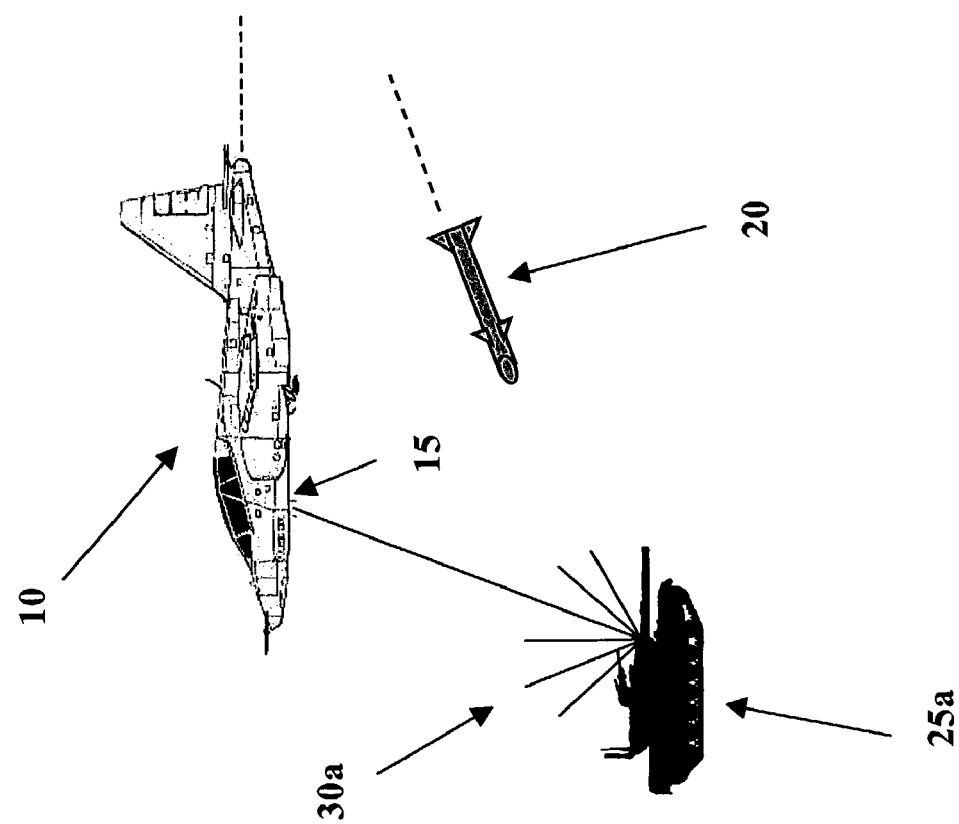
Figure 2A:
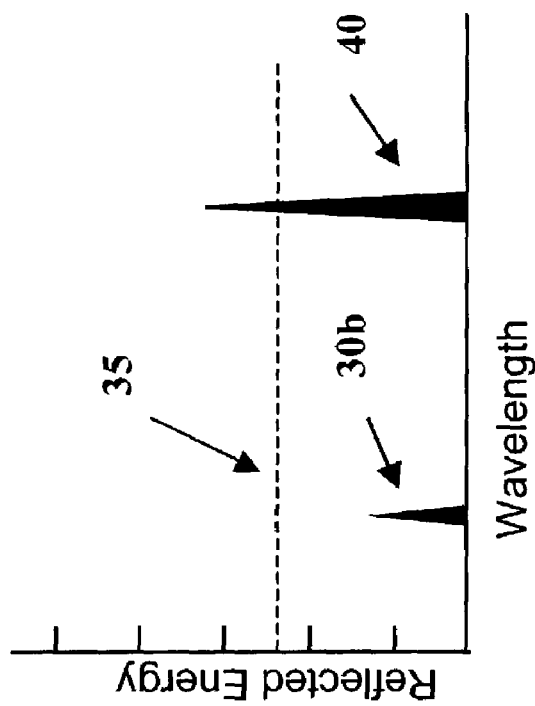
Figure 2B:
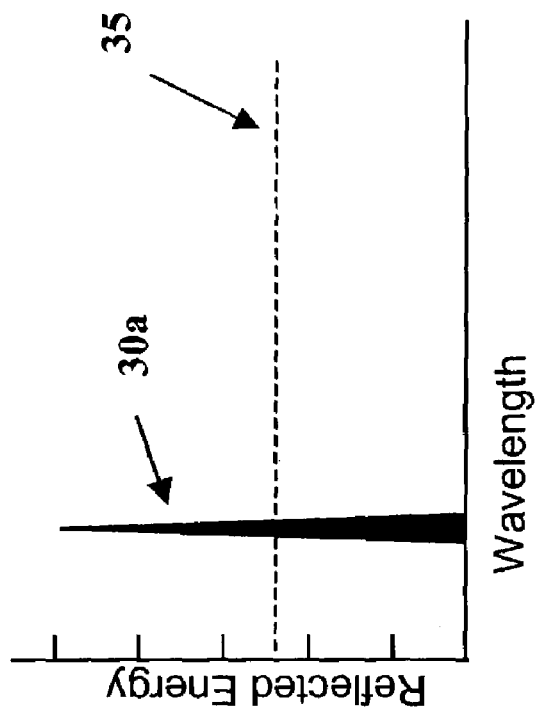
Figure 3:
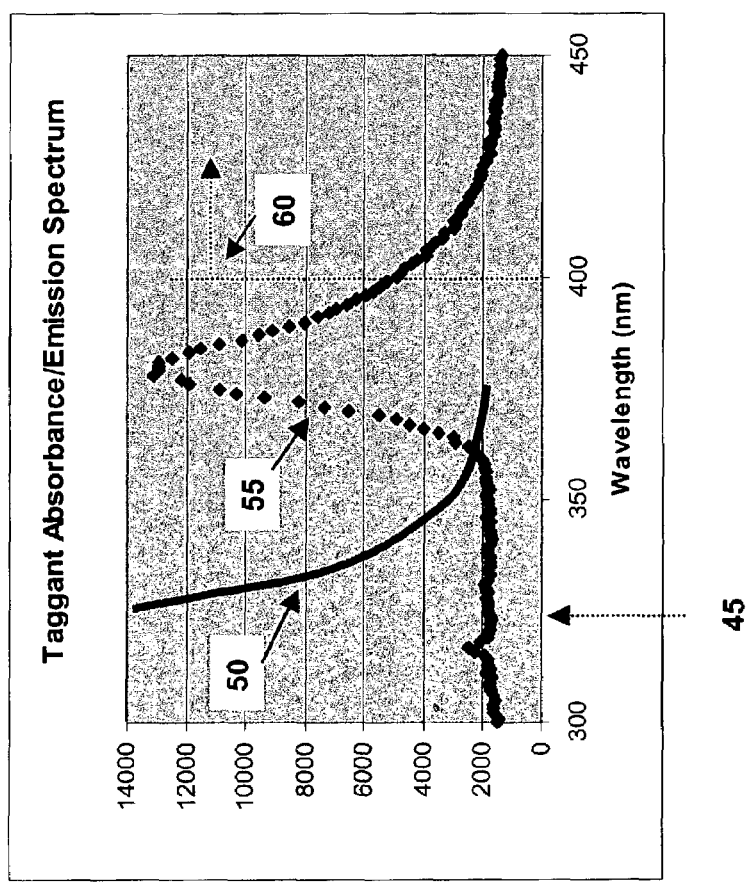
Figure 4B:
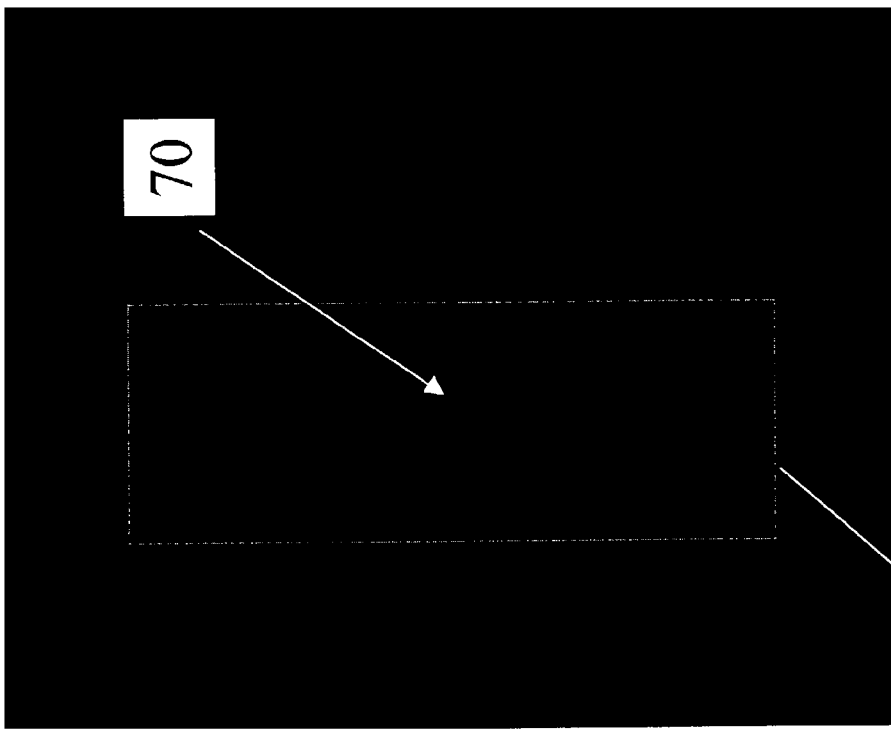
Figure 4A:
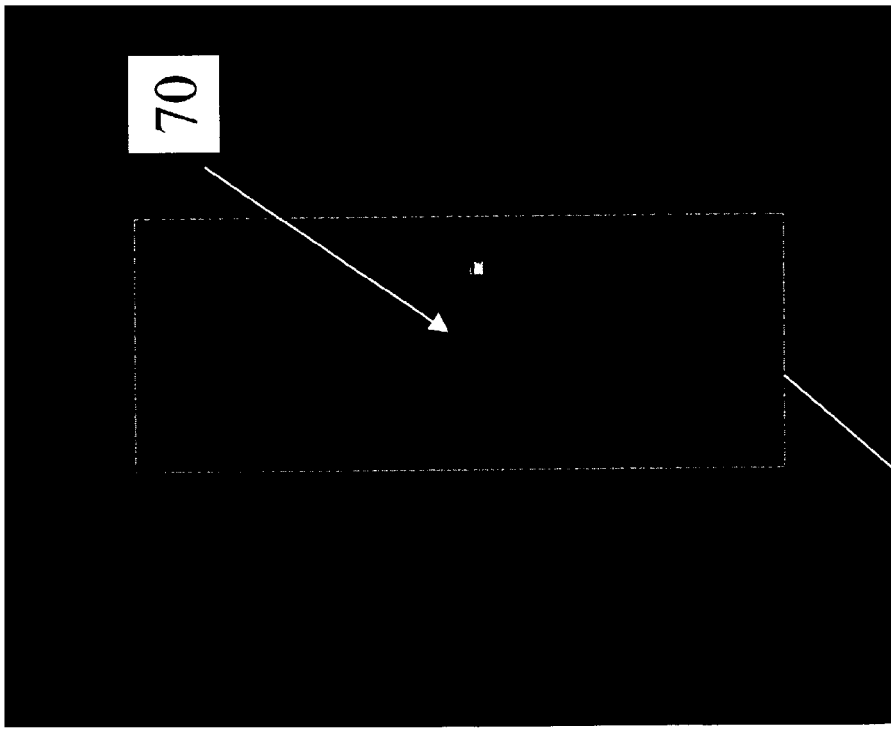
Figure 4D:
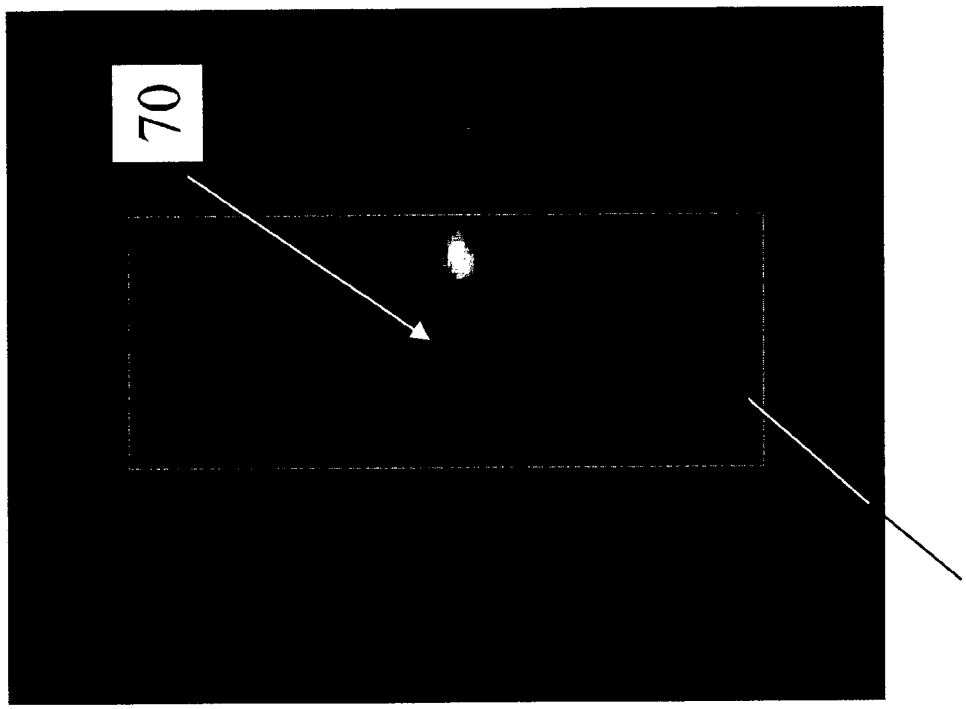
Figure 4C:
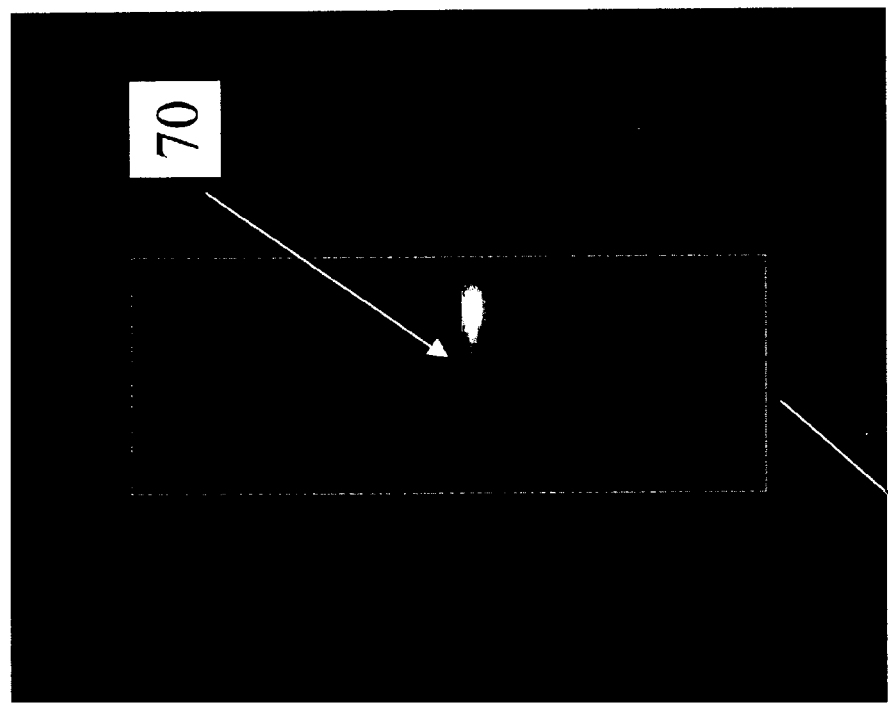

Tang, Z., et al., "Spontaneous Organization of Single CdTe Nanoparticles into Luminescent Nanowires," *Science*, vol. 297, pp. 237-240, Jul. 12, 2002 with 1 supplemental page providing Figure S1.

Nanosys, "Developing Nano" [online], [Retrieved on Oct. 16, 2003], 12 pp., Retrieved from the Internet: http://www.nanosysinc.com/technology.html.

* cited by examiner

METHOD AND SYSTEM FOR COUNTERING LASER TECHNOLOGY

CROSS-REFERENCE TO RELATED APPLICATIONS

The current application claims priority to Provisional Patent Application Ser. No. 60/421,574 entitled "Light Absorbing Material" filed Oct. 28, 2002, which is incorporated herein by reference in its entirety.

BACKGROUND OF THE INVENTION

1. Field of the Invention

The invention is directed generally to laser technology countermeasures and more particularly to the use of absorption technology in order to counter laser detection systems.

2. Description of the Related Art

Currently, there are a variety of detectors, shields and obscurants that are used to detect and/or counteract or shield the effects of laser-based threats. Laser-based threats are used in a variety of capacities to do everything from locating and destroying tanks, artillery, planes, ships, cargo vans and other targets to temporarily or permanently blinding individuals.

Certain laser warning receivers utilize technology that detects and prioritizes the threat level of a laser-based threat and transmits audible and visual warnings on or through a display. This technology serves to indicate to the crew when a target, such as reconnaissance vehicles, armored personnel carrier or main battle tank has been targeted by the laser-based threat, so that the crew may be able to take evasive action, if necessary. Crewmembers are alerted that an enemy has either completed a firing solution or that a precision-guided munition or beamriding missile is heading for their vehicle. Similarly, laser-warning receivers for aircraft detect laser radiation and use signal processing to determine the type of threat and the direction of its source. These electro-optical countermeasures consist of externally mounted sensor units and an inboard interface unit comparator and associated test equipment.

Further, to protect the eye from laser irradiation in the visible to near-IR region, technology has been developed in the form of filter inserts for soldiers' eyewear, also called ballistic and laser protective spectacles (BLPS). The BLPS are dye-filled polycarbonate plastic filters which will protect eyesight against low-energy lasers, specifically the two or three wavelengths used by common range finders and target designators based on Nd:YAG and ruby lasers. The BLPS will not give protection against frequency-agile low energy laser weapons. The filters can provide up to three notches before reception is impaired. To protect thermal imagers from laser irradiation in the far IR spectral region, a filter is employed in front of the sensitive detectors.

Other laser-based threat protection mechanisms include the use of organic absorption dyes to absorb the laser radiation, reflection of the laser radiation using optical coatings or other effects that alter the reflective properties of an intended target's surface, and the blocking of specific wavelengths.

Finally, in certain situations, attenuative properties of smoke, dust, dirt and other particulates allow it to serve as a passive defense against blinding laser weaponry. Large-area smoke generation provides a means for continuous protection for forward elements of U.S. combat forces.

SUMMARY OF THE INVENTION

Summary of the Problem

Light detection and ranging ("LIDAR") which uses the same principle as RADAR, is used to detect and provide range information for numerous targets. In operation, an instrument based on LIDAR concepts transmits light out to a target. The transmitted light interacts with and is changed by the target. Some of this light is reflected/scattered back to the instrument where it is analyzed. Instruments utilizing LIDAR include, for example, laser rangefinders, laser beam-rider missiles, and laser target designators. The change in the properties of the light enables some property of the target to be determined. The time for the light to travel out to the target and back to the LIDAR receiver is used to determine the range to the target. In certain situations, e.g., military situations, there is a need to mask or counteract the effects of LIDAR in order to protect the target from detection. Currently available cloaking technologies, e.g., based on organic dyes, rare earth materials and fluorescent pigments, are expensive and susceptible to variations in environmental constraints, e.g., temperature and precipitation. There is a need in the art for a method and system for cloaking targets from the effects of LIDAR.

Laser generated effects are also used to temporarily or permanently blind individuals. For example, laser dazzlers or laser dissuaders are used by, for example, police, armed forces, or even civilians to temporarily blind a suspect, enemy or the like using laser radiation at or below the permanent eye damage threshold. Consequently, there is a need in the art for a method and system for counteracting or negating the laser generated effects.

Summary of the Solution

Embodiments of the present invention describe a method and system for providing a countermeasure against laser detection systems using nanodot material that is tailored to cloak a target from detection by absorbing and/or down-converting the transmitted laser radiation.

A first specific embodiment describes a method for countering target detection by a laser detection device. The method includes engineering a first nanocomponent material to absorb at a first transmitted radiation wavelength of a first laser detection device; and applying the first nanocomponent material to the target, wherein at least a portion of the first transmitted radiation wavelength of the first laser detection device is absorbed by the first nanocomponent material such that a first reflected radiation wavelength from the target is below a level that is detectable by the first laser detection device.

A second specific embodiment describes a material for countering laser effects directed at a target. The material includes at least a first nanocomponent material comprised of multiple first nanocomponents, wherein each of the multiple first nanocomponents are engineered to absorb and down-convert a first transmission radiation of a first laser directed at the target; and a mixer material for mixing with the first nanocomponent material, wherein the mixer material facilitates the addition of the first nanocomponent material to the target.

Further embodiments of the present invention describe a method and system for providing a countermeasure against laser generated blinding effects using nanodot material as an obscurant by absorbing and/or down-converting the transmitted laser radiation.

A third specific embodiment describes a method for obscuring a target from laser effects. The method includes engineering a first nanocomponent material to absorb at a first transmitted radiation wavelength of a first laser transmission device; and releasing the first nanocomponent material in the vicinity of the target, wherein the first transmitted wavelength of the first laser transmission device is absorbed by the first nanocomponent material, prior to reaching the target.

BRIEF DESCRIPTION OF THE FIGURES

The patent or application file contains at least one drawing executed in color. Copies of this patent or patent application publication with color drawing(s) will be provided by the Office upon request and payment of the necessary fee.

In the Figures:

FIG. 1*a* shows a problem scenario solved by an embodiment of the present invention;

FIG. 1*b* shows a cloaking system according to an embodiment of the present invention;

FIG. 2*a* shows a reflectance level vs. wavelength chart according to the operation of the scenario shown in FIG. 1*a;*

FIG. 2*b* shows a reflectance level vs. wavelength chart according to the operation of the cloaking system shown in FIG. 1*b;*

FIG. 3 shows an absorbance and emission plot according to an embodiment of the present invention; and FIGS. 4*a*–4*d* show emission as a function of concentration according to embodiments of the present invention.

DETAILED DESCRIPTION OF THE PREFERRED EMBODIMENTS

In a first preferred embodiment of the present invention, a laser absorbing compound is used to cloak a target from transmitted laser radiation. Referring to FIG. 1*a*, an uncloaked target 25*a* is detected by laser radiation 15 transmitted from plane 10. More particularly, the reflected laser radiation 30*a* is above the laser threshold, e.g., signal to noise (S:N) ratio of the detector within the laser beam-rider weapon 20, which uses the reflected laser radiation 30*a* to acquire and interdict the uncloaked target 25*a*. FIG. 1*a* illustrates a problem scenario that the first preferred embodiment is able to solve. FIG. 2*a* shows the reflected laser radiation 30*a* from the target 25*a* surpassing the S:N ratio 35 for the detector within the laser beam-rider weapon 20.

In comparison, utilizing the cloaking system and method of the first embodiment of the present invention, FIG. 1*b* illustrates the situation wherein the laser radiation 15 transmitted from plane 10 is mostly absorbed by the target and/or the reflected laser radiation 30*b* is (a) below the S:N ratio of the detector within the laser beam-rider weapon 20, (b) reflected at one or more wavelengths that are not detectable by the detector within the laser beam-rider weapon 20, or (c) a combination of (a) and (b). FIG. 2*b* shows the reflected laser radiation 30*b* from the target 25*b* falling below the S:N ratio 35 for the detector within the laser beam-rider weapon 20 and down-converted reflected laser radiation 40. Down-converted reflected laser radiation 40, though above the S:N ratio 35 required by the detector within the laser beam-rider weapon 20, is not within the range of detectable wavelengths, and this is not detected by the laser beam-rider weapon 20. As shown in FIG. 1*b*, the laser beam-rider weapon 20 is unable to locate the cloaked target 25*b* and either does not release from the plane 10 or, in the case of guided weapons, misses the target 25*b*.

In the first embodiment of the present invention, cloaking of the target 25*b* is accomplished using nanodot manufacturing technology to produce target coatings that are able to absorb and/or down-convert impinging laser radiation with high efficiency, thus significantly reducing the S:N ratio. For example, nanodots can be produced to absorb greater than 95% of incident light thereby minimizing the amount of light that is reflected. In particular, the absorption, phosphorescence, and reflective properties of the nanodots may be tailored in order to counteract, i.e., absorb and/or down-convert expected laser radiation. Altering a nanodot's composition, size, and additive components allows it to absorb laser radiation with high efficiency and then phosphoresce or dissipate the laser energy to higher wavelengths through conduction, convection, or radiation, e.g., as infrared light, thus producing the effect illustrated in FIG. 2*b*.

Referring to FIG. 3 this plot shows the absorption and emission spectrum for an exemplary nanodot configuration. More particularly, in this specific example, nanodots are engineered to absorb ultraviolet ("UV") laser radiation from a 10 mW incident laser source having a wavelength of approximately 325 nanometers ("nm") 45. The plot shows the absorbance curve 50 for the nanodots beginning at approximately 325 nm and the emission curve 55 for the nanodots centered around approximately 380 nm, with a portion of the emission curve 55 falling into the visible spectrum 60, i.e., 400–700 nm.

As shown in FIGS. 4*a*–4*b*, the amount of laser radiation that is absorbed is proportional to the nanodot concentration. In each of FIGS. 4*a*–4*b*, a cuvette 65 containing various concentrations of nanodots was placed in the path of the 10 mW incident laser. In FIG. 4*a*, the cuvette contained no UV nanodots and the cuvette has minimal UV absorption and does not down-convert the UV radiation, but rather reflects the UV radiation as indicated at the sample/radiation interaction point 70. In FIG. 4*b*, the cuvette contains 10 μg/ml of UV absorption nanodots, in FIG. 4*c* the cuvette contains 1 mg/ml of UV absorption nanodots and in FIG. 4*d* the cuvette contains 10 mg/ml of UV absorption nanodots. The progressively higher concentrations of UV absorption nanodots through the progression of FIGS. 4*a*–4*d* show the change at the sample/radiation interaction point 70 from UV reflection with no nanodots, FIG. 4*a*, to increased UV absorption and visible emission, FIGS. 4*b*–4*c*, to high UV absorption and low visible emission in FIG. 4*d*. FIG. 4*d* shows that less than 200 μg of dots are required to completely absorb the 10 mW incident laser light, i.e., >50 W/g.

The specifically tailored nanodots may then be mixed with an optically and chemically inert, i.e., does not interfere with the function of the nanodots, material, such as paint or the like, to produce materials that can be applied to potential targets. Multiple sets of nanodots may be engineered as described herein, wherein each set of nanodots is engineered to counteract a different laser radiation wavelength. These multiple sets of nanodots may be added to an optically and chemically inert, i.e., does not interfere with the function of the nanodots, base coating material, e.g., paint, so that a single target would be able to counteract multiple laser radiation wavelengths.

Nanodots are also referred to as quantum dots and as nanocrystals. Although described throughout as "nanodots," the characteristics and uses described herein of nanodots extend to other nanocomponents such as nanocrystals, nanorods, nanowires, and nanotubes and the use of the term nanodots is not intended to be limiting. Throughout the description herein, they will be referred to as nanodots. A nanodot generally has dimensions in the nanometer range, e.g., up to 100 nm. The nanodots described herein are capable of withstanding temperatures in excess of 1,000 degrees Celsius and several hundred psi of pressure for a duration of at least one second. The nanodots are uniquely designed and engineered for a number of frequencies. Nanodots can be engineered in the ultraviolet, visible, and IR spectrums, covering a range of thousands of nanometers. For example, nanodots made out of InAs can be engineered to absorb and emit in a range of 700 to 2,000 nanometers, from the visible to the IR. In engineering the characteristics of the nanodots, the diameter of the nanodot is directly related to the absorption and emission characteristics of the nanodot. Another example is a CdSe nanodot that can be engineered to absorb light in the visible blue region anywhere from 400 into the 600 nanometers. Further, InP can be engineered to create nanodots that absorb and emit in the visible green region, from 500 into the 700 nanometer range. Similarly, an InAs nanodot can be manufactured to absorb at, for example, 1064 nanometers, which is a common wavelength for military type lasers. These are but a few examples of the materials and frequency ranges from and for which nanodots can engineered. Nanodots can be engineered out of any semiconductor material. Nanodots are generally made from Group II–VI (e.g., MgS, MgSe, MgTe, CaS, CaSe, CaTe, SrS, SrSe, SrTe, BaS, BaSe, BaTe, ZnS, ZnSe, ZnTe, CdS, CdSe, CdTe, HgS, HgSe, and HgTe) and Group III–V (e.g., GaAs, InGaAs, InP, and InAs) semiconductor compounds that are capable of emitting electromagnetic radiation upon excitation. U.S. Pat. Nos. 6,306,736; 5,505,928; 5,262,357; and 5,990,479, which are incorporated herein by reference in their entirety, provide a description of various semiconductor nanodots and methods for forming such nanodots. Additionally, U.S. patent application Ser. No. 10/255,054, filed Sep. 26, 2002 entitled "Method and System for Detection Using Nanodot Taggants" is also incorporated by reference herein in its entirety. Further, as described briefly above, other nanocomponents may be used as countermeasures and may be formed of similar material compositions. For example, CdTe nanowire can be engineered to absorb in the visible region anywhere from 500 to 650 nanometers. This specific formulation is described in the article entitled, "Spontaneous Organization of Single CdTe Nanoparticles into Luminescent Nanowires," by Tang et al., Science, Vol. 297, 12 Jul. 2002, which is incorporated by reference herein in its entirety.

In a second embodiment of the present invention, different sets of nanodots having different absorption and emission wavelengths are utilized in a countermeasure method and system that includes both cloaking and decoying. More specifically, in for example, a combat situation where numerous tanks, trucks, and other potential convoy targets may be targeted by a laser beam-rider weapon, targets containing actual supplies, weapons, humans, etc. are coated with cloaking nanodots, i.e., nanodots that are tailored to absorb the transmitted laser radiation and reflect the detectable reflection wavelength at below threshold levels and emit reflected radiation in an undetectable wavelength due to down-conversion of the transmitted laser radiation. At the same time, remotely controlled decoy targets that do not contain actual supplies, weapons or humans are coated with nanodots specifically tailored to absorb the transmitted radiation and emit the reflected radiation specifically within the wavelength of the detector, above the threshold level. In response to the positive identification received in response to the transmitted laser radiation, the user may decide to destroy the target using a weapon directed to the identified target. According to this embodiment, an enemy may be tricked into believing that they are destroying targets within the convoy, when in fact they are destroying non-essential targets within the convoy, while the essential targets remain cloaked and intact. Reconnaissance by the enemy will falsely suggest that key targets have been destroyed, when in the fact the destroyed targets are decoys.

In a third embodiment of the present invention, tailored nanodots are utilized as an obscurant in order to counteract the blinding effects of certain lasers. In a particular example, the nanodots are tailored to absorb the transmitted laser radiation as described above and then the nanodots are encapsulated due to their small size, i.e., on the order of a couple of angstroms. The incorporation or encapsulation may be within a polymer, e.g., a polymer matrix such as polystyrene or PMMA (Polymethylmethacrylate). The encapsulated nanodots are on the order of 1 up to 100 microns. This size is significant due to the fact that nanodots of this size will have the characteristics of a gaseous medium and behave as a gas when released into the air. The encapsulated nanodots are then released in the vicinity of or ahead of the targeted individuals seeking to avoid temporary blindness in order to absorb the transmitted laser radiation prior to it reaching the targeted individuals. The encapsulated nanodots may be released as part of a smoke obscurant, such that the combination of smoke and tailored, encapsulated nanodots acts as both a visual obscurant and a transmitted laser radiation countermeasure. Additionally, the smoke containing tailored nanodots may be used as an obscurant, either in place of or in addition to the coating on targets, to counteract the use of laser detectors to track vehicles and the like.

What is claimed is:

1. A method for countering target detection by a light source detection device comprising:

engineering a first nanocomponent material to absorb at a first transmitted radiation wavelength of a first light source detection device; and applying the first nanocomponent material to the target, wherein at least a portion of the first transmitted radiation wavelength of the first light source detection device is absorbed by the first nanocomponent material such that a first reflected radiation wavelength from the target is below a level that is detectable by the first light source detection device;

wherein the first nanocomponent material is comprised of a semiconductor material selected from Group II–VI and Group III–V material.

2. The method according to claim 1, wherein the first nanocomponent material is comprised of multiple first nanocomponents, wherein each first nanocomponent is less than 100 μm in diameter.

3. The method according to claim 2, wherein the first nanocomponents are selected from the group consisting of nanodots, nanorods, nanowires, and nanotubes.

4. The method according to claim 1, further comprising:

engineering a second nanocomponent material to absorb at a second transmitted radiation wavelength of a second light source detection device; and applying the second nanocomponent material to the target, wherein at least a portion of the second transmitted radiation wavelength of the second light source detection device is absorbed by the second nanocomponent material such that a second reflected radiation wavelength from the target is below a level that is detectable by the second light source detection device.

5. The method according to claim 4 wherein the second nanocomponent material is comprised of a semiconductor material.

6. The method according to claim 5 wherein the semiconductor material is selected from Group II–VI and Group III–V material.

7. The method according to claim 4, wherein the second nanocomponent material is is comprised of multiple second nanocomponents, wherein each second nanocomponent is less than 100 μin diameter.

8. The method according to claim 7, wherein the second nanocomponents are selected from the group consisting of nanodots, nanorods, nanowires, and nanotubes.

9. The method according to claim 4, wherein the second nanocomponent material is comprised of multiple second nanocomponents, wherein each second nanocomponent is less than 100 nm in diameter.

10. The method according to claim 1, wherein the first nanocomponent material is comprised of multiple first nanocomponents, wherein each first nanocomponent is less than 100 nm in diameter.

11. A material for countering light source effects directed at a target comprising:
    at least a first nanocomponent material comprised of multiple first nanocomponents, wherein each of the multiple first nanocomponents are engineered to absorb and down-convert a first transmission radiation of a first light source directed at the target; and
    a mixer material for mixing with the first nanocomponent material, wherein the mixer material facilitates the addition of the first nanocomponent material to the target;
    wherein the first nanocomponent material is comprised of a semiconductor material selected from Group II–VI and Group III–V material.

12. The material according to claim 11, wherein the mixer material is paint.

13. The material according to claim 11, wherein the transmission wavelength is in the infrared spectrum.

14. The material according to claim 11, wherein each of the multiple first nanocomponents its is less than 100 μm in diameter.

15. The material according to claim 11, wherein each of the multiple first nanocomponents are selected from the group consisting of nanodots, nanorods, nanowires, and nanotubes.

16. The material according to claim 11, further comprising a second nanocomponent material comprised of multiple second nanocomponents, wherein each of the multiple second nanocomponents are engineered to absorb and down-convert a second transmission radiation of a second laser directed at the target.

17. The material according to claim 11, wherein each of the multiple first nanocomponents fits is less than 100 m in diameter.

* * * * *

UNITED STATES PATENT AND TRADEMARK OFFICE
CERTIFICATE OF CORRECTION

PATENT NO. : 7,035,308 B1
APPLICATION NO. : 10/411274
DATED : April 25, 2006
INVENTOR(S) : Scott Earl McNeil et al.

It is certified that error appears in the above-identified patent and that said Letters Patent is hereby corrected as shown below:

IN THE CLAIMS -
Col. 7, Line 5,
In Claim 7, Line 2, please change "nanocomponent material is is comprised of multiple second" to --nanocomponent material is comprised of multiple second --.

Col. 7, Line 7,
In Claim 7, Line 4, please change "less than 100 uin diameter." to -- less than 100 um in diameter. --

Col. 8, Line 9,
In Claim 14, Line 2, please change "the multiple first nanocomponents its is less than 100 um in" to -- the multiple first nanocomponents is less than 100 um in --.

Col. 8, Line 22,
In Claim 17, Line 2, please change "the multiple first nanocomponents fits is less than 100 m in" to -- the multiple first nanocomponents is less than 100 nm in --.

Signed and Sealed this

First Day of August, 2006

JON W. DUDAS
*Director of the United States Patent and Trademark Office*